(12) United States Patent
Gyllenhammar et al.

(10) Patent No.: US 12,084,051 B2
(45) Date of Patent: Sep. 10, 2024

(54) SCENARIO IDENTIFICATION IN AUTONOMOUS DRIVING ENVIRONMENTS

(71) Applicant: ZENUITY AB, Gothenburg (SE)

(72) Inventors: Magnus Gyllenhammar, Pixbo (SE); Håkan Sivencrona, Jörlanda (SE)

(73) Assignee: Zenuity AB, Gothenburg (SE)

( * ) Notice: Subject to any disclaimer, the term of this patent is extended or adjusted under 35 U.S.C. 154(b) by 47 days.

(21) Appl. No.: 17/477,943

(22) Filed: Sep. 17, 2021

(65) Prior Publication Data
US 2022/0089153 A1     Mar. 24, 2022

(30) Foreign Application Priority Data
Sep. 18, 2020  (EP) .................................. 20196795

(51) Int. Cl.
*B60W 30/095*     (2012.01)
*B60W 40/04*      (2006.01)
(Continued)

(52) U.S. Cl.
CPC ........ *B60W 30/0956* (2013.01); *B60W 40/04* (2013.01); *B60W 60/0015* (2020.02);
(Continued)

(58) Field of Classification Search
CPC ............. B60W 30/0956; B60W 40/04; B60W 60/0015; B60W 60/00274;
(Continued)

(56) References Cited

U.S. PATENT DOCUMENTS

| | | | |
|---|---|---|---|
| 9,965,956 B2 * | 5/2018 | Tsushima | B60W 30/09 |
| 2014/0172235 A1 * | 6/2014 | Werling | B60W 30/12 |
| | | | 701/41 |
| 2015/0344030 A1 * | 12/2015 | Damerow | G06V 20/588 |
| | | | 701/1 |

(Continued)

OTHER PUBLICATIONS

Extended European Search Report mailed Feb. 22, 2021 for European Patent Application No. 20196795.7, 9 pages.
(Continued)

*Primary Examiner* — Peter D Nolan
*Assistant Examiner* — Anwar Mohamed
(74) *Attorney, Agent, or Firm* — Sage Patent Group (57) ABSTRACT

A method for identifying scenarios of interest for development, verification and/or validation of an ADS of vehicle. Obtaining risk map of surrounding environment of vehicle, risk map is formed based on actuation capability of vehicle and location of free-space areas in surrounding environment. The actuation capability comprises uncertainty estimation for actuation capability and location of free-space areas comprises uncertainty estimation for estimated location of free-space areas. Risk map includes risk parameter for each of a plurality of area segments comprised in surrounding environment of vehicle. Determining compounded risk value of ADS based on risk parameters of a set of area segments of risk map. Monitoring scenario trigger by monitoring at least one of determined compounded risk value against compounded risk trigger threshold, a development of risk map over time against a map volatility trigger threshold, and a development of compounded risk value over time against a risk volatility threshold.

15 Claims, 7 Drawing Sheets (51) Int. Cl.
*B60W 60/00* (2020.01)
*G06V 20/58* (2022.01)

(52) U.S. Cl.
CPC ....... *B60W 60/00274* (2020.02); *G06V 20/58* (2022.01); *B60W 2554/4041* (2020.02); *B60W 2556/40* (2020.02); *B60W 2556/50* (2020.02)

(58) Field of Classification Search
CPC ..... B60W 2554/4041; B60W 2556/40; B60W 2556/60
See application file for complete search history.

(56) References Cited

U.S. PATENT DOCUMENTS

| | | |
|---|---|---|
| 2016/0086285 A1 | 3/2016 | Jordan Peters et al. |
| 2017/0089710 A1* | 3/2017 | Slusar ................ G01C 21/3833 |
| 2017/0186319 A1* | 6/2017 | Tsushima .......... B60W 30/0956 |
| 2018/0075309 A1* | 3/2018 | Sathyanarayana ....... G06N 7/01 |
| 2020/0130682 A1* | 4/2020 | Buerkle ................ G08G 1/166 |
| 2020/0334473 A1* | 10/2020 | Heck .................. G01C 21/3461 |
| 2020/0369294 A1* | 11/2020 | Jeon ................ B60W 60/00276 |
| 2022/0315051 A1* | 10/2022 | Patel ................ B60W 60/0015 |

OTHER PUBLICATIONS

Puphal, Tim et al.; "Probabilistic Uncertainty-Aware Risk Spot Detector for Naturalistic Driving", IEEE Transactions on Intelligent Vehicles, vol. 4, No. 3, Sep. 2019, pp. 406-415 (10 pages).
1 Office Action mailed Jan. 18, 2024 for European Patent Application No. 20196795.7, 5 pages.

* cited by examiner

SCENARIO IDENTIFICATION IN AUTONOMOUS DRIVING ENVIRONMENTS

CROSS-REFERENCE TO RELATED APPLICATIONS

The present application for patent claims priority to European Patent Office Application Ser. No. 20196795.7, entitled "SCENARIO IDENTIFICATION IN AUTONOMOUS DRIVING ENVIRONMENTS" filed on Sep. 18, 2020, assigned to the assignee hereof, and expressly incorporated herein by reference.

TECHNICAL FIELD OF THE INVENTION

The present disclosure relates to automated driving systems, and in particular to risk estimation for vehicles equipped with an automated driving system.

BACKGROUND

During these last few years, the development of autonomous vehicles has exploded and many different solutions are being explored. An increasing number of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, development is ongoing in both ADAS as well as Autonomous Driving (AD), within a number of different technical areas within these fields. ADAS and AD will herein be referred to under the common term Automated Driving System (ADS) corresponding to all of the different levels of automation as for example defined by the SAE J3016 levels (0-5) of driving automation.

Accordingly, in a not too distant future, ADS solutions will to a greater extent find their way into modern vehicles. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles and/or relevant signage.

Thus, with a fleet of vehicles equipped with ADS features it is possible to collect huge amounts of data for development, verification and validation of current and future features. However, most of collected data does not contain information that progress either of the three tasks listed above. Additionally, the rate of data from all the sensors of a fully equipped ADS can amount to several gigabytes per second. Thus, storing and sending all data may not even be feasible.

There is therefore a need in the art to utilize the possibility of data collection that is enabled by the "ADS fleet" in an efficient manner that at the same time ensures that data important for development, verification and validation of the ADS is not lost.

SUMMARY OF THE INVENTION

It is therefore an object of the present invention to provide a method, a computer-readable storage medium, a control system, and a vehicle that alleviate all or at least some of the above-discussed drawbacks of presently known systems and methods.

Further, it is an object of the present invention to provide a method, a computer-readable storage medium, a control system, and a vehicle that enable for efficient data collection by a fleet of ADS equipped vehicles while ensuring that data important for development, verification and validation of the ADS is not lost.

This object is achieved by means of a method for identifying scenarios of interest for development, verification and/or validation of an ADS of a vehicle, a computer-readable storage medium, a control system, and a vehicle as defined in the appended claims. The term exemplary is in the present context to be understood as serving as an instance, example or illustration.

According to a first aspect of the present invention, there is provided a method for identifying scenarios of interest for development, verification and/or validation of an ADS of a vehicle. The method comprises obtaining a risk map of a surrounding environment of the vehicle, wherein the risk map is formed based on an actuation capability of the vehicle and a location of free-space areas in the surrounding environment. The actuation capability comprises an uncertainty estimation for the actuation capability and the location of free-space areas comprises an uncertainty estimation for the estimated location of free-space areas. The risk map comprises a risk parameter for each of a plurality of area segments comprised in the surrounding environment of the vehicle. Further, the method comprises determining a compounded risk value of the ADS based on the risk parameters of a set of area segments of the risk map. The method further comprises monitoring a scenario trigger by monitoring at least one of the determined compounded risk value against a compounded risk trigger threshold, a development of the risk map over time against a map volatility trigger threshold, and a development of the compounded risk value over time against a risk volatility threshold. Then, if the scenario trigger is detected, the method comprises storing sensor data, where the stored sensor data being from a time period around a point in time when the scenario trigger was detected.

Scenario identification is an important part in the process of generating data that can be utilized for development, verification and/or validation of current and future ADS features. The herein proposed approach concretely states how points outside the nominal situations can be identified with respect to the risk that the ADS is exposed to. In more detail, the use of a risk map does enables the scenario identification to be performed in a complete and holistic way taking the whole ADS and the models of its environments into account rather than relying on a single threat measure or similar. Thus, a more reliable scenario identification process is disclosed, thereby ensuring that high quality data is not lost during a driving session.

According to a second aspect of the present invention, there is provided a (non-transitory) computer-readable storage medium storing one or more programs configured to be executed by one or more processors of an in-vehicle processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention, there is provided a control system for identifying scenarios of interest for development, verification, and/or validation of an ADS of a vehicle. The control system comprises control circuitry configured to obtain a risk map of a surrounding environment of the vehicle based on an actuation capability of the vehicle and a location of free-space areas in the surrounding environment. The actuation capability includes an uncertainty estimation for the actuation capability and the location of free-space areas comprises an uncertainty estimation for the estimated location of free-space areas. The risk map comprises a risk parameter for each of a plurality of area segments comprised in the surrounding environment of the vehicle. Further, the control circuitry is configured to determine a compounded risk value of the ADS based on the risk parameters of a set of area segments of the risk map, and to monitor a scenario trigger by monitoring at least one of the following triggers:

The determined compounded risk value against a compounded risk trigger threshold.

A development of the risk map over time against a map volatility trigger threshold.

A development of the compounded risk value over time against a risk volatility threshold.

Then, if the scenario trigger is detected, the control circuitry is further configured to store sensor data, the stored sensor data being from a time period around a point in time when the scenario trigger was detected. With this aspect of the invention, similar advantages and preferred features are present as in the previously discussed first aspect of the invention.

According to a fourth aspect of the present invention, there is provided a vehicle comprising an automated driving system (ADS), a perception system comprising at least one sensor configured to monitor a surrounding environment of the vehicle, a vehicle control system comprising at least one sensor configured to monitor an actuation capability of the vehicle, a localization system configured to monitor a geographical map position of the vehicle, and a control system according to any one of the embodiments disclosed herein. With this aspect of the invention, similar advantages and preferred features are present as in the previously discussed first aspect of the invention. With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the invention will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

In the present context, a risk map estimates and quantifies a view of the "risk" across the ADS's surrounding (i.e. of the ego-vehicle's surroundings), and preferably includes sensor capabilities, uncertainties in detections and predictions as well as uncertainties in the available capabilities of the vehicle platform.

The present invention proposes a means to leverage the possibility of data collection from an ADS equipped vehicle fleet and to increase the probability of collecting valuable data for development, verification, and validation of current and future ADS features. Accordingly, the herein proposed invention presents one solution to mitigate the problems associated with collecting highly relevant and valuable data by gauging the risk of each situation that the ADS is exposed to using a risk map. It was realized by the present inventors that scenarios that are concluded as "high-risk situations" may provide an efficient way of identifying valuable and useful scenarios and data to support development as well as verification and validation of the ADS. In more detail, the proposed solution of using a risk map, as defined herein, provides the advantage of increasing the probability that most, if not all, "high-risk situations" are identified and such that they may subsequently be sent/stored for further analysis. A scenario may in the present context be interpreted as the time-evolution of several situations.

Development and verification of ADS solutions is currently very costly and time consuming where a large portion of the work goes into identifying and solving tasks that are challenging for current ADS features to solve, often referred to as "edge cases" or "corner cases". An additional problem is that solving these corner cases don't give any immediate customer value until the overall performance has reached an acceptable level for safety and availability. Thus, by means of the present invention, a solution to facilitate the identification of these "corner cases" is provided, advantages in terms of reduced costs and improved time management with respect to ADS development, verification, and validation are readily achievable. However, it should be noted that the methods and systems disclosed herein are not limited to the identification of "corner cases" per se, but may also capture other scenarios or situations that are of interest for the development, verification, and validation of current and future ADS features.

In summary, the present invention aims to provide a means for concretely identifying situations or scenarios outside of the nominal situations by the utilization of a risk map. The risk map provides a complete and holistic way taking the whole ADS and the models of its environments into account rather than relying on a single threat measure or similar. Thus, the utilization of a risk map provides an efficient way to identify the abovementioned corner cases in the form of "high-risk situations", i.e. to identify situations or scenarios that are of importance for the development, verification, and validation of ADS features. Moreover, the identification of these "high-risk situations" also allows for efficiently capturing malfunctions in the models underpinning the operations of the ADS, thereby facilitating troubleshooting of the ADS.

Several different ways to utilize the risk map in order to identify interesting data or scenarios that the ADS of the vehicle is exposed are proposed herein. For example, one may monitor the compounded risk present in each situation and compare this to a predefined threshold in order to identify "high-risk scenarios". Additionally or alternatively, one may monitor the change of the compounded risk of consecutive scenarios/situations and compare this change against a predefined threshold. If this threshold is exceeded it may also be an indication of a possible malfunction of the ADS or an interesting external situation. Additionally, or alternatively one may monitor changes in the formed risk map between consecutive time steps/samples and compare these changes to a predefined threshold. If this "risk map volatility" threshold is exceeded, it may also be an indication of interesting external changes, which the current models (used to form the risk map) apparently are unable to capture and thus result in the volatile risk map, or it might be due to problems internal to the ADS where sub-components of the system deliver volatile outputs.

Figure 1:
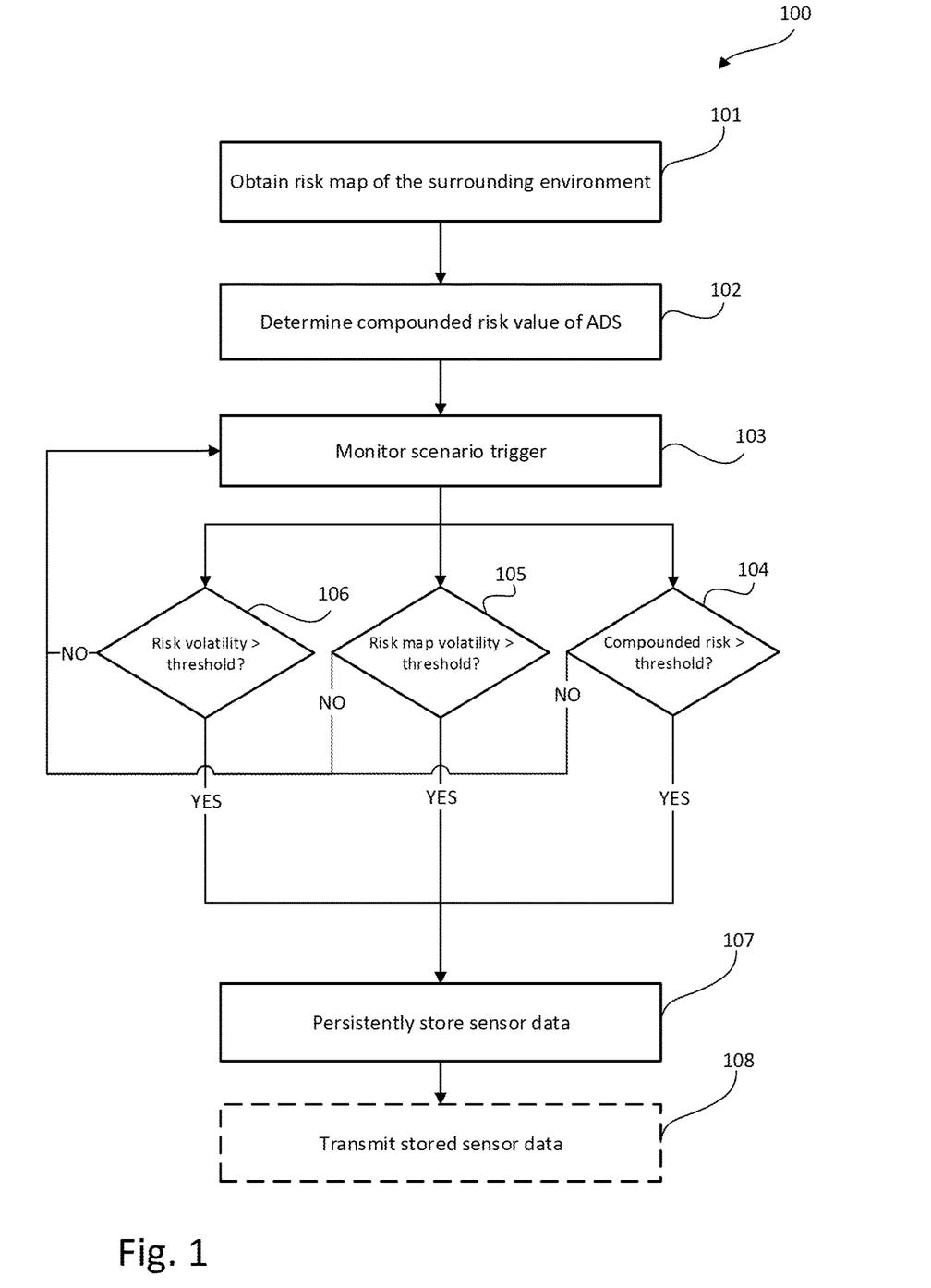
FIG. 1 is a schematic flow chart of a method for identifying scenarios of interest for development, verification and/or validation an Automated Driving System (ADS) of a vehicle in accordance with an embodiment of the present invention.

FIG. 1 illustrates a schematic flow chart representation of a method 100 for identifying scenarios of interest for development, verification and/or validation an Automated Driving System (ADS) of a vehicle in accordance with an embodiment of the present invention. The method 100 comprises obtaining 101 a risk map of a surrounding environment of the vehicle. The risk map is formed based on an actuation capability of the vehicle and a location of free-space areas in the surrounding environment, the actuation capability including an uncertainty estimation for the actuation capability and the location of free-space areas comprising an uncertainty estimation for the estimated location of free-space areas. Moreover, the risk map comprises a risk parameter for each of a plurality of area segments comprised in the surrounding environment of the vehicle.

The actuation capability of the vehicle may for example include one or more actuation parameters such as e.g. braking capacity, maximum steering angle, maximum acceleration capability, etc. including an uncertainty estimate for each parameter. The actuation capability and the associated uncertainty estimate(s) may be determined in real-time based on a predefined model given one or more real-time variables such as e.g. current speed, vehicle properties (vehicle dimensions, vehicle weight, etc.), road surface properties, and so forth, as readily understood by the skilled person in the art. The uncertainty estimates may be derived from predefined statistical models associated with each actuation parameters, where the actuation capability is given by the mean or mode value and the uncertainty estimate is given by e.g. one or two standard deviations above or below the mean.

The free-space areas may for example be derived from sensor data of one or more vehicle-mounted sensors configured to monitor the surrounding environment of the vehicle. Nevertheless, the sensor data may also originate from other sensors in the vicinity of the vehicle, e.g. sensors mounted on other vehicles or on infrastructure elements and obtained via a V2V or V2X communication network.

Free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may be understood as estimates of areas absent of external objects (static and dynamic objects) as well as an estimate of the uncertainty of this determination, i.e. the likelihood of the determined location of the free-space area actually being true.

Moreover, in some embodiments, the location of free-space areas comprises a position of external objects located in the surrounding environment of the ego-vehicle. The estimated position of the external objects may include uncertainties of the position of the external objects, estimated trajectories of any dynamic objects of the external objects and uncertainties of the estimated trajectories of the dynamic objects. However, in some embodiments the location of free-space areas is determined by a dedicated module of the vehicle, where the dedicated module is configured to obtain sensor data indicative of the surrounding environment of the vehicle, and to derive the location of the free-space areas with respect to the vehicle based on the sensor data. Thus, there does not have to be an intermediate step or layer where objects are detected before the location of the free-space areas is obtained, i.e. the "free-space area" may be obtained directly. For example, a signal emitted by a Lidar may propagate through space for a certain distance before it is reflected from some surface, then this area between the Lidar and the surface may be defined as a "free-space area" without any operation or step to define the surface that the signal was reflected from.

Accordingly, in some embodiments the method 100 may further comprise a step of obtaining (sensor) data indicative of the actuation capability of the vehicle and the uncertainty estimation of the actuation capability, and the location of free-space areas and the uncertainty estimation for the estimated location of free-space areas. Optionally, the method 100 may further comprise obtaining (sensor) data indicative of a position of external objects in the surrounding environment of the vehicle relative to the vehicle and uncertainties of the position of the external objects, trajectories of any dynamic objects of the external objects and uncertainties of the estimated trajectories of the dynamic objects, and a geographical position of the vehicle, the geographical position including an uncertainty estimation of the estimated geographical position of the vehicle.

Accordingly, one can utilize the ADS's readily available functionality of estimating the "free space" in the surrounding area of the ego-vehicle and the functionality of estimating the operating capabilities of the vehicle platform (both of which are generally used for making decisions and controlling the vehicle), and then use this functionality in order to generate a risk map. In some embodiments, the step of obtaining 101 the risk map comprises forming the risk map based on the obtained (sensor) data.

Figure 4:
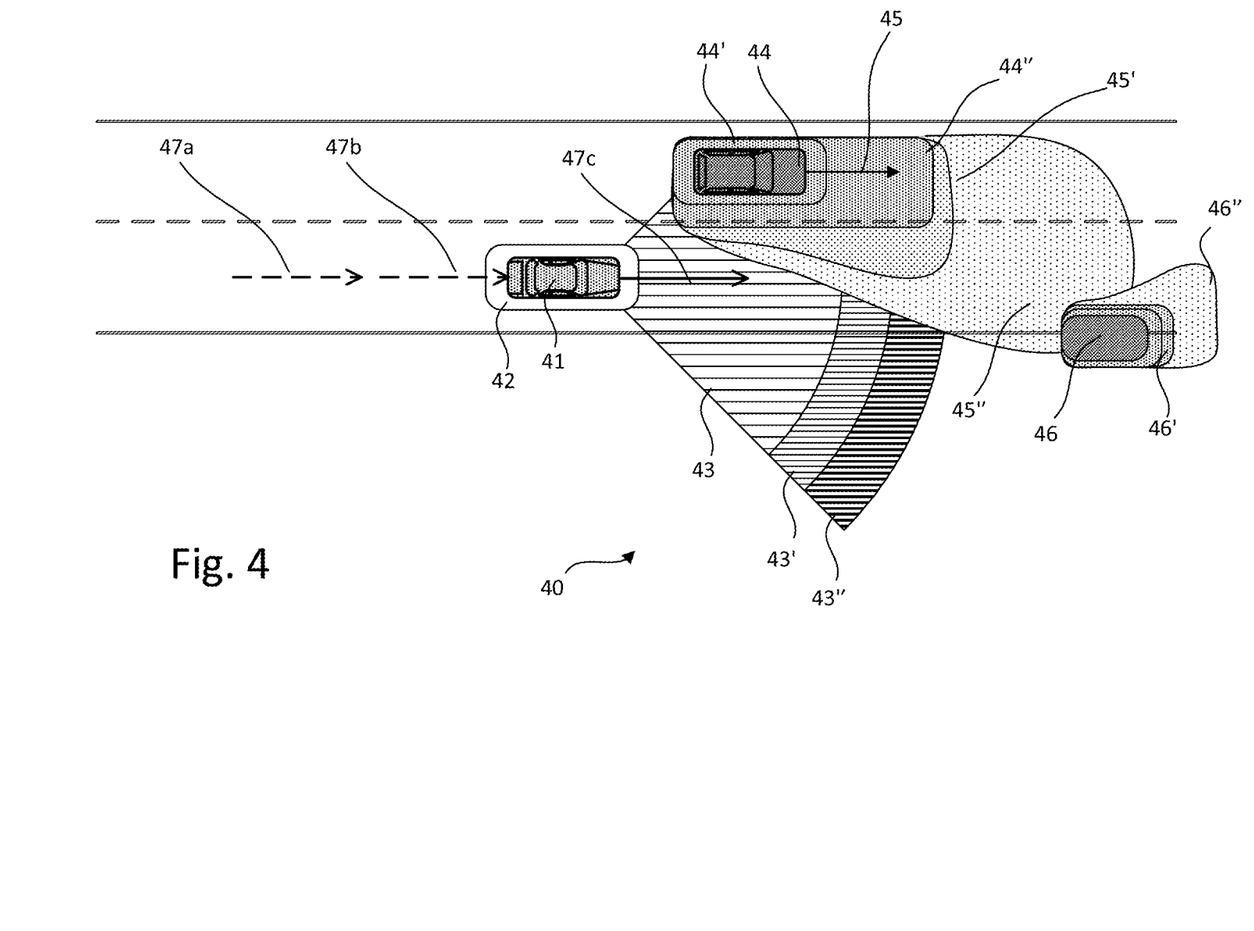
FIG. 4 is a schematic top view illustration of a risk map with some of the different components contributing to the risk map in accordance with an embodiment of the present invention.
Figure 5:
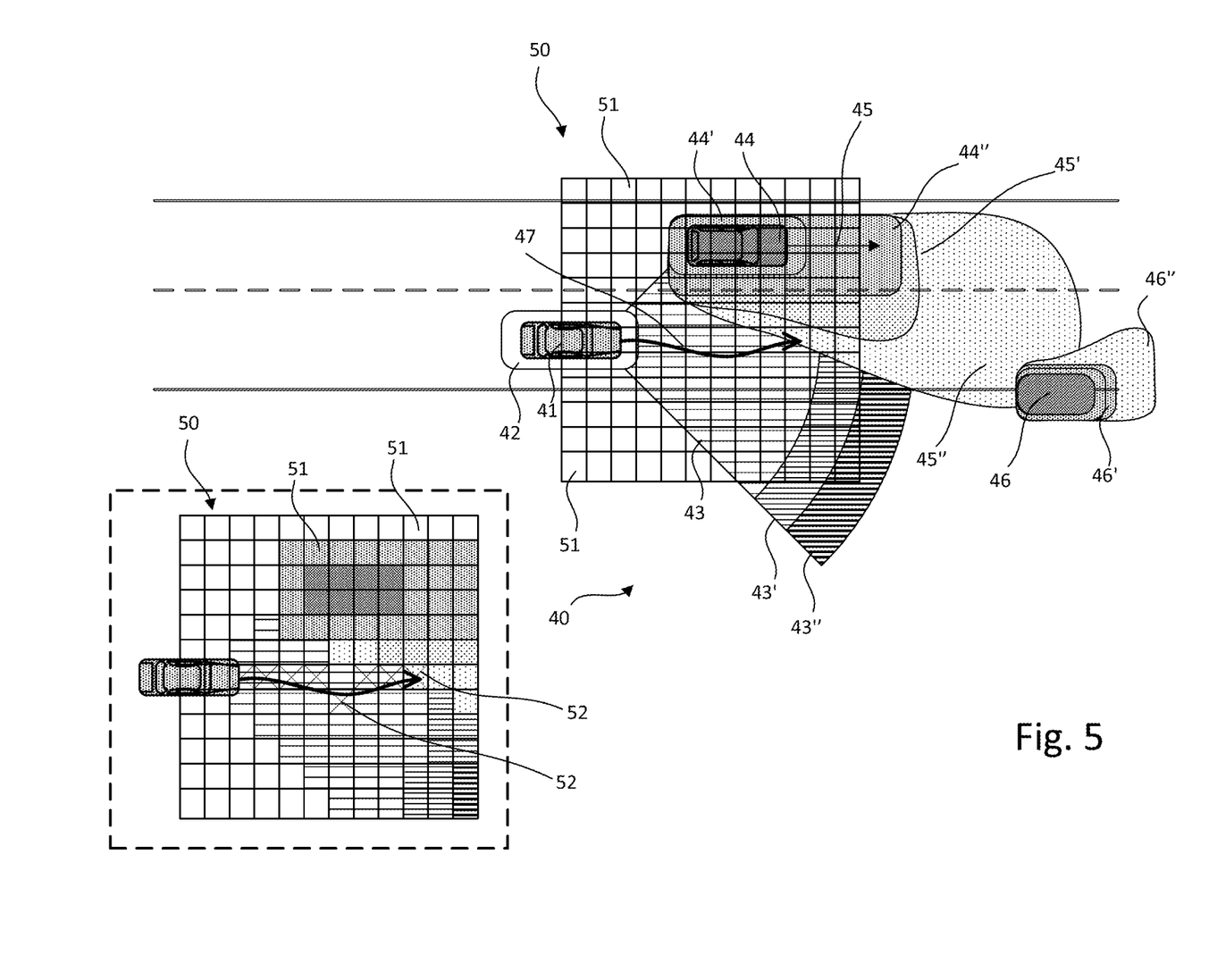
FIG. 5 is a schematic top view illustration of a risk map from FIG. 5 with area segments indicated in the form of a grid in accordance with an embodiment of the present invention.
Figure 6:
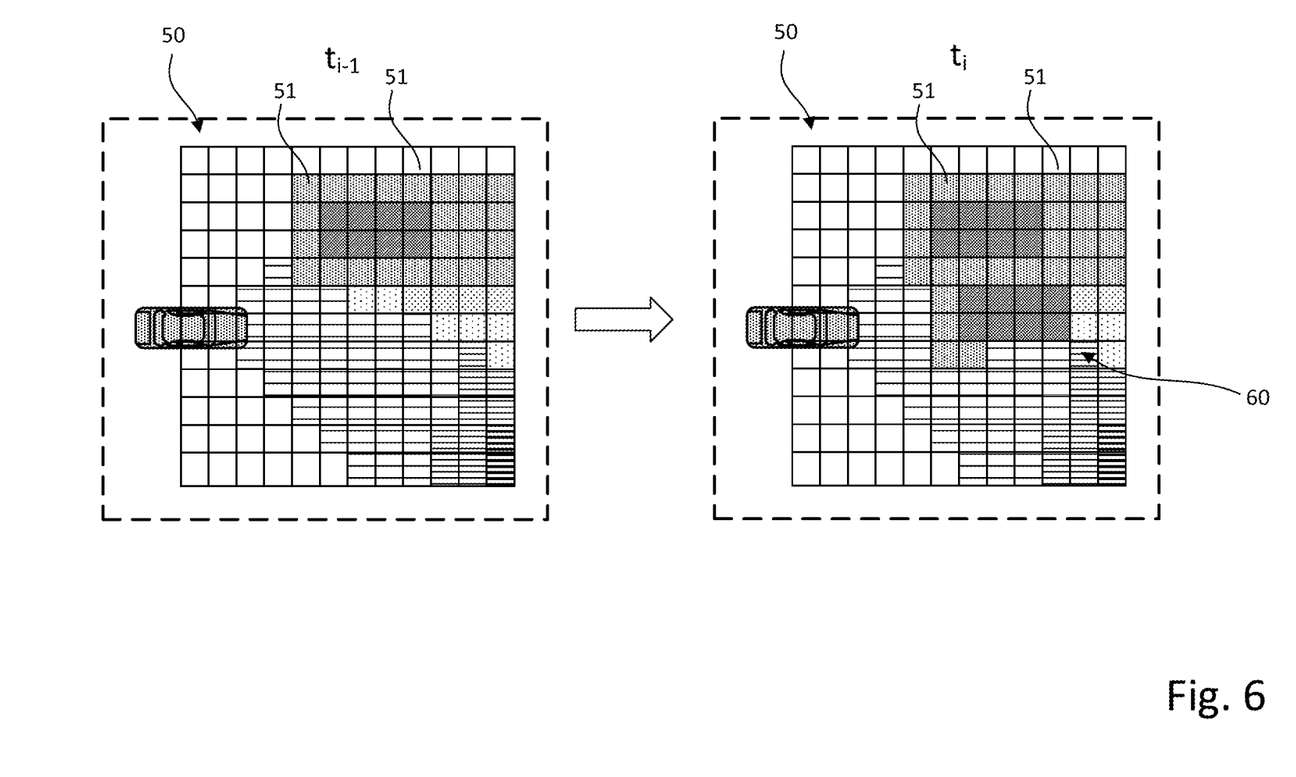
FIG. 6 is a schematic top view illustration of a risk map volatility triggering in accordance with an embodiment of the present disclosure.

Examples of a risk map are depicted in FIGS. 4-6, where the risk map is formed based on the worldview of the ADS including the uncertainties of the detections and predictions from the perception system, the localisation within the map, as well as the capabilities and the uncertainties of the capabilities of the vehicle platform.

Each risk parameter may for example be indicative of a probability of an accident event or of a probability of violating any predefined safety margin or threshold if the vehicle were to occupy an associated area segment, or more specifically for a planned path of the vehicle to intersect that area segment. In a simplified example, if a first area segment is completely within an area occupied by an external vehicle, then that first area segment may have a risk parameter indicating that the first area segment is a "high risk" segment. This is at least partly based on the logical reasoning that if the vehicle's planned path were to intersect that segment, one can assume that there is a relatively high probability of collision with the external vehicle. Analogously, if a second area segment is completely within a drivable road segment void of any external objects, then that second area segment may have a risk parameter indicating that the second area segment is a "low risk" segment.

The term "probability of violating a predefined safety margin or threshold" may for example be an estimate of a probability of violating a predefined minimum distance to other vehicles. In more detail, one can assume that the probability of violating such a safety threshold increases when the planned path of the vehicle involves a take-over maneuverer, or maneuvering through dense traffic as compared to driving on an empty highway. Thus, given some statistical model indicative of certain scenarios occurring in the operational design domain (ODD) of the vehicle, one can estimate the probability of an external vehicle performing an unexpected maneuver which would cause a violation of the predefined minimum distance to a lead vehicle, and also estimate the probabilities of this specific action taking place on various scenarios. As mentioned, one can assume that there is a higher risk of being exposed to such "unexpected maneuvers" in dense city traffic than on empty highways. In other words, the risk parameters does not necessarily have to indicate a probability of an accident event, but may be defined on other metrics such as exemplified above. Other examples include other quality metrics such as distance to road edge, magnitude of jerk (e.g. lateral acceleration), and so forth.

Stated differently, these high risk/low risk segments may be quantified to a probability score using statistical modelling based on historical data that has been collected over time from real driving scenarios, e.g. if the ego-vehicle's planned path were to intersect segment A, then the historical data indicated that the probability of collision/violation of safety threshold is X. In more detail, as mentioned, these statistical models may be more or less complex taking into account various factors such as time of day, day of the week, distance to other vehicles, angle relative to other vehicle, type of other vehicle, speed of other vehicle, speed of ego-vehicle, geographical position, and so forth. For example, one may statistically conclude that there is a higher probability of collision in an area segment 1 meter behind a vehicle than in an area segment 50 meters behind the same vehicle. Thus, the area segment close to the rear of the external vehicle will be given a higher risk value or a risk parameter indicative of the "higher risk", than the area segments far away from the external vehicle.

The method 100 further comprises determining 102 a compounded risk value of the ADS, or a compounded risk value that the ADS is exposed to, based on the risk parameters of a set of area segments of the risk map. The set of area segments may be comprise one or more of the plurality of area segments of the formed risk map. Accordingly, in some embodiments the compounded risk value is determined based on the plurality of area segments of the formed risk map. For example, one may determine 102 the compounded risk value by aggregating all of the risk parameters of the area segments of the full risk map and dividing by the number of area segments comprised in the full risk map, in order to obtain an "average risk score" of that situation. Looking at the entire risk map to get the compounded risk value could be done through any choice of statistical measure across the map. However, other ways, involving more or less complex operations in order to compute the compounded risk value based on the plurality of area segments of the formed risk map are feasible.

In some embodiments, the compounded risk value is determined 102 based on a set of area segments intersected by at least one planned path of the ADS. The planned path may in the present context to be understood as a "planned and selected" path, i.e. a path that has been selected for execution. Thus, a planned path may be an executed path, or a path about to be executed. Accordingly, the method 100 may further comprise obtaining the planned path of the ADS. The term "at least one" planned path is to be interpreted that the compounded risk value may be determined on one or more planned paths depending on how "a planned path" is defined. For example, in some cases a planned path will actually comprise a plurality of "paths" or segments of the planned path where only the imminent one is "planned" and the others are subject to change depending on how the scene around the vehicle evolves.

In some embodiments, the compounded risk value is determined 102 based on a set of area segments intersected by at least one nominal path on the risk map. The nominal path may for example be a simple "straight path" along the road in the vehicle's traveling direction. In some embodiments, the compounded risk value is determined 102 based on a set of area segments intersected by a plurality of nominal paths on the risk map. Alternatively, one may calculate an "average risk" based on the risk parameters of each reachable area segment given the current traveling direction and velocity of the vehicle. In some embodiments, the compounded risk value is determined 102 based on a set of area segments intersected by a lowest risk path, where the lowest risk path is a path out of a plurality of generated candidate paths of the ADS that is associated with the lowest compounded risk value.

In other words, the compounded risk of a single situation may be judged from the risk map by e.g. calculating the risk of a nominal path on the map, using the ADS planned path, taking the lowest risk path available or by looking at the entire risk map. In summary, the compounded risk is to be understood as a value indicative of the risk that the ADS/vehicle is currently exposed to (i.e. at this time instant) given the current risk map.

The determination 102 of the compounded risk may for example be simplified through the use of a grid framework, as depicted in e.g. FIG. 5. Thus, in some embodiments, the step of determining 102 the compounded risk value comprises aggregating the risk parameters of the set of area segments intersected by each planned path of the at least one planned path. Thus, the compounded risk value depends on the current yet-to-be-executed path. In some embodiments, the compounded risk value is determined based on the aggregated risk parameters and a total number of samples used to generate the aggregated risk parameters in order to obtain a risk exposure per time unit. Further details regarding the computation of the compounded risk are provided in reference to FIG. 3.

In some embodiments, the method 100 further comprises obtaining map data comprising HD map information of the surrounding environment and a geographical position of the vehicle, where the estimated geographical position includes an uncertainty estimation of the estimated geographical position of the vehicle. Accordingly, the risk map is formed further based on the obtained map data.

Further, in some embodiments, the ADS associated with a statistical model indicative of a statistical distribution related to a plurality of scenarios in the surrounding environment of the ego-vehicle. Accordingly, the method 100 may further comprise obtaining a probability of at least one scenario occurring in the surrounding environment of the vehicle, such that the risk map is further formed based on the obtained probability of the at least one scenario occurring in the surrounding environment of the vehicle. Further details related to the statistical modelling of scenarios in the surrounding environment of the vehicle is available in the European Patent Application No. EP20169897.4 by the same Applicant, Zenuity AB from Gothenburg, Sweden, incorporated herein by reference, and will for the sake of brevity and conciseness not be further elaborated upon.

Moving on, the method 100 further comprises monitoring 103 by monitoring 104, 105, 106 at least one of:
The determined compounded risk value against a compounded risk trigger threshold.
A development of the risk map over time against a map volatility trigger threshold.
A development of the compounded risk value over time against a risk volatility threshold.

Further, if the scenario trigger is detected, i.e. if any one of the monitored parameters exceed a corresponding threshold, the method 100 comprises storing 107 (sensor) data from a plurality of (sensor)s of the vehicle, the stored (sensor) data being from a time period around a point in time when the scenario trigger was detected. Accordingly, three different triggers are given and monitored in order to identify the above-discussed "high-risk situations", where the risk map provides the input needed to enable the monitoring 104, 105, 106. In some embodiments, the method 100 further comprises transmitting 108 the stored 107 (sensor) data to a remote entity. The term "sensor data" is in the present context to be interpreted broadly and does not necessarily mean that raw sensor data is stored but be in the form of processed sensor data indicative of the worldview of the ADS including the uncertainties of the detections and predictions from the perception system, the localisation within the map, as well as the capabilities and the uncertainties of the capabilities of the vehicle platform.

In some embodiments, the step of storing 107 sensor data further comprises storing the formed risk map, wherein the stored risk map is from a time period around the point in time when the scenario trigger was detected. Moreover, the transmitted 108 (sensor) data may further be indicative of the stored risk map.

To capture the entire chain of events that leads up to the identified interesting scenario (i.e. up to the scenario trigger), it is further suggested that one utilizes a running buffer to store data indicative of the perception system outputs, as well as data indicative of intermediate system states. The buffer may range from a few seconds up to several minutes (such as e.g. 30 seconds). After an interesting event is detected, i.e. once the scenario trigger is detected, the system may continue store the information for an additional time (e.g. half the buffer length). Once that is stored 107 the entire buffered data may be sent 108 to the remote entity (e.g. "the cloud" or "the back-office") for further analysis. Alternatively, the buffered data may be sent to a local persistent memory if connection to the cloud is unavailable.

Accordingly, in some embodiments, the method 100 further comprises temporarily storing the sensor data in a data buffer, where the data buffer has a buffer length in the range of 1 second to 300 seconds, such as e.g. 30 seconds, 60 seconds, 90 seconds, or 120 seconds. Thus, the step of storing 107 (sensor) data may comprise transferring sensor data from the data buffer, e.g. to a remote entity or to a local persistent memory. The transferred (sensor) data comprises (sensor) data from the time period around the point in time when the scenario trigger was detected, i.e. the transferred (sensor) data may comprise data from the time period from 15 seconds before the scenario trigger was detected to 15 seconds after the scenario trigger was detected.

Figure 2:
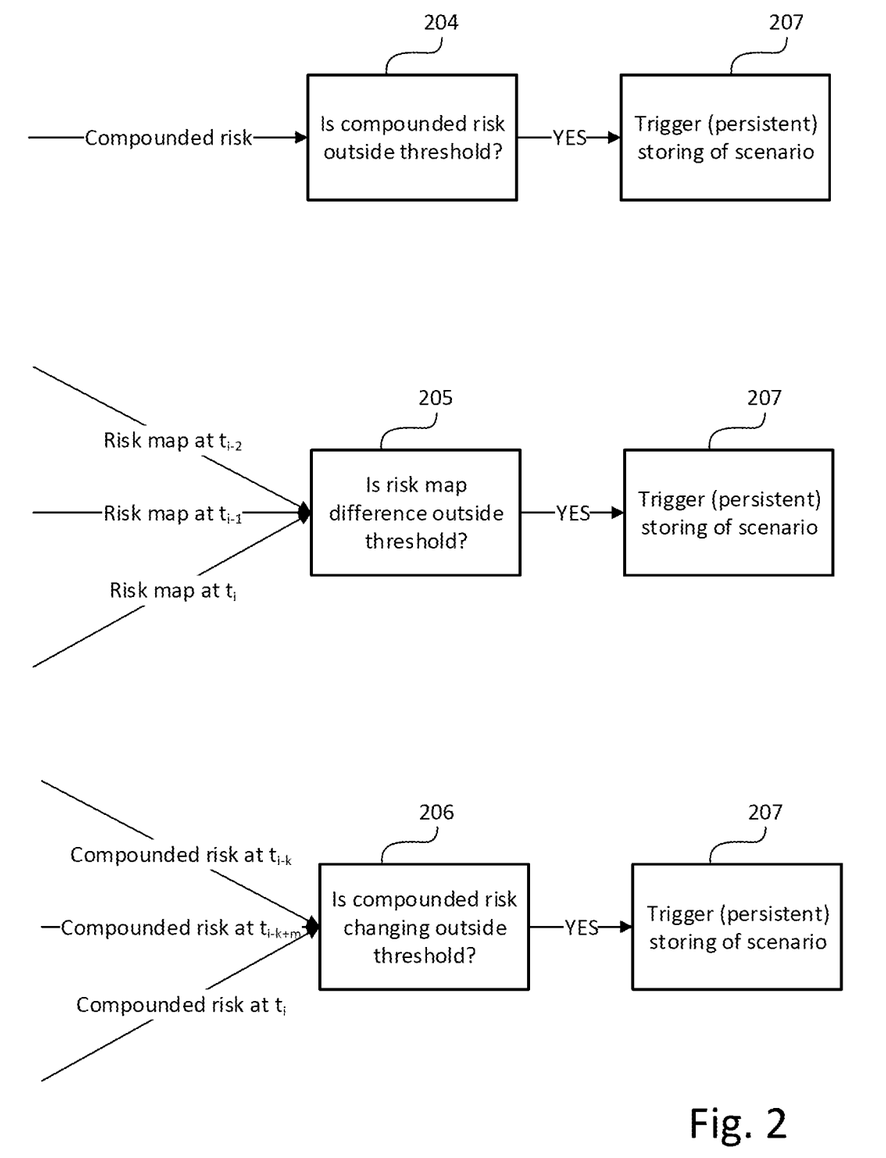
FIG. 2 is a schematic flow chart of a set of scenario triggers in accordance with an embodiment of the present disclosure.

FIG. 2 depicts the three monitoring examples in the form of three parallel flow chart representations in accordance with an embodiment of the present disclosure. In more detail, FIG. 2 illustrates three examples of how interesting data or an interesting scenario that the ADS is exposed to may be identified. The interesting scenario may for example be indicative of possible malfunctions in the models used to form the risk map itself (i.e. malfunctions of the models underpinning the operations of the ADS) or an interesting external situation that can be used for development, verification and/or validation of the ADS.

In some embodiments, the step of monitoring 104 the determined compounded risk value against the compounded risk trigger threshold comprises, for each time instant or time sample, comparing 204 the determined compounded risk value with the compounded risk trigger threshold. Accordingly, if the comparison indicates a deviation above the compounded risk trigger threshold, the method comprises storing 207 (sensor) data, where the stored 207 (sensor) data is from a time period around a point in time when the comparison indicated the deviation above the compounded risk trigger threshold. For example, if the sampling rate is 1 Hz, then the determined compounded risk value is computed once every second and compared 204 against the compounded risk trigger threshold in order to determine if there is a deviation indicative of a scenario of interest occurring in the surrounding environment of the vehicle.

Analogously, the step of monitoring 105 the development of the risk map over time against the map volatility trigger threshold comprises, for each time instant ($t_i$) or time sample ($t_i$), comparing 205 a difference between the obtained risk map and an obtained risk map of a preceding time instant ($t_{i+1}$) with the map volatility threshold. Accordingly, if the comparison 205 indicates a deviation above the map volatility threshold, the method comprises storing 207 (sensor) data, where the stored 207 (sensor) data is from a time period around a point in time ($t_i$) when the comparison 205 indicated the deviation above the map volatility threshold. For example, if the sampling rate is 1 Hz, then the determined risk map is obtained/updated once every second and compared 205 against the map volatility threshold in order to determine if there is a deviation, which in turn may be indicative of possible malfunctions in the models used to form the risk map itself.

An example of risk map volatility is illustrated in FIG. 6, where the obtained risk map at time instant ($t_i$) differs from the risk map obtained at a preceding time instant ($t_{1+1}$). As indicated in the right-most drawing of FIG. 6, a discrepancy 60 was detected in the risk map obtained at time instant ($t_i$) as compared with the risk map obtained at the preceding time instant ($t_{i+1}$). Here, the discrepancy 60 is illustrated in the form of a number of "high-risk" area segments 51 appearing in front of the ego-vehicle that were not present in the preceding time instant.

Analogously one could detect a discrepancy if the scene evolved in the opposite way, i.e. that a number of "high-risk" area segments suddenly disappear. Similarly, a discrepancy may be concluded if the combined value of the risk parameters of the area segments 51 differs from the combined value of risk parameters of the area segments 51 above a predefined threshold. In other words, the risk map volatility threshold may be triggered due to interesting external changes, which the current models (that the ADS's worldview is based upon) apparently are unable to capture and thus result in the volatile risk map, or it might be due to problems internal to the ADS where sub-components of the system delivers volatile outputs. Accordingly, the map volatility may be determined in various ways as exemplified in the foregoing.

Further, reverting back to FIG. 2, another example of how to identify interesting data or scenarios is to monitor the change of the compounded risk in order to check 206 if the change in compounded risk between two consecutive time instances/samples is above a threshold. Accordingly, in some embodiments, the step of monitoring the development of the compounded risk value over time comprises, for each time instant (ti), comparing 206 a difference between the determined compounded risk value and a compounded risk value of a preceding time instant (ti−1) with the risk volatility threshold. If the comparison indicates a deviation above the risk volatility threshold, the method comprises storing 207 (sensor) data, where the stored 207 (sensor) data being from a time period around a point in time when the comparison 206 indicated the deviation above the risk volatility threshold.

Executable instructions for performing these functions are, optionally, included in a non-transitory computer-readable storage medium or other computer program product configured for execution by one or more processors.

Figure 3:
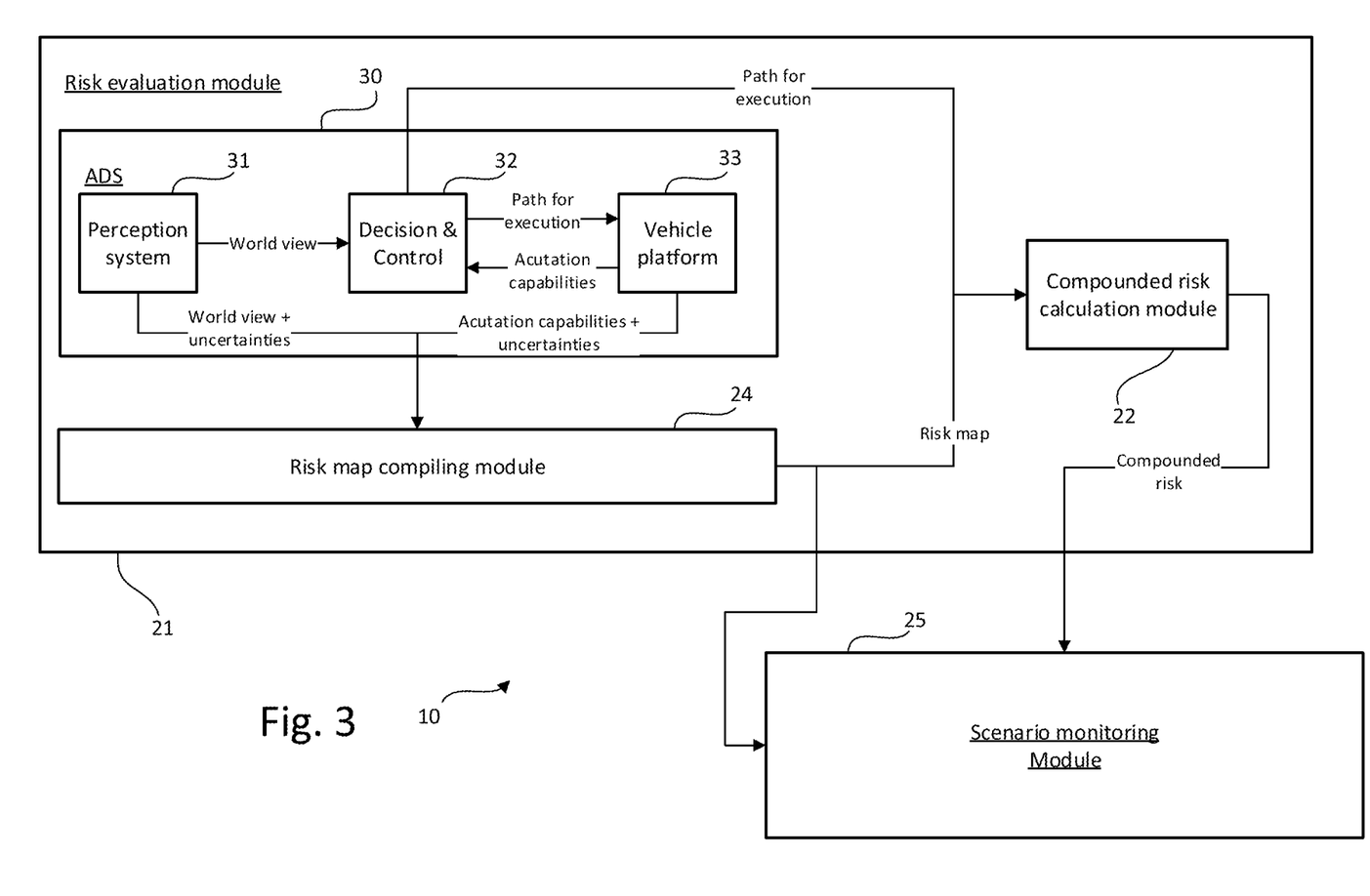
FIG. 3 is a schematic block diagram representation of a system for identifying scenarios of interest for development, verification and/or validation an Automated Driving System (ADS) of a vehicle in accordance with an embodiment of the present invention.

FIG. 3 is a schematic block diagram representation of a control system 10 for estimating a risk exposure of an ADS of a vehicle in accordance with an embodiment of the present invention. The control system 10 comprises control circuitry that may be realized as a software controlled processor. However, the control circuitry may alternatively be realized wholly or partly in hardware. In the depicted embodiment of FIG. 3, the control circuitry comprises a set of modules, however, these are not necessarily to be construed as limiting to the present invention, but serve to further elucidate the present invention. As readily understood by the skilled artisan there are several ways to practically realize the inventive concepts disclosed herein, for example by other types of software/hardware architectures than the example embodiment illustrated in FIG. 3 without departing from the scope of the present invention. Such variations may depend on intended applications or system specifications.

Moving on, the control system 10 comprises a risk evaluation module 21, which is configured to compile the risk map and to evaluate the risk exposure of the ADS by determining a compounded risk based on the planned path and the risk map or based on an aggregation of the risk parameters of the area segments in the risk map. In more detail, the risk map is built up of the worldview of the ADS 30 including the uncertainties of the detections and predictions from the perception system 31 (i.e. the estimated location of free-space areas), the localisation within the map as well as the uncertainties of the capabilities of the vehicle platform 33. The ADS 30 is herein depicted as a module comprising a sub-module for decision and control 32, where information from the perception system 31 and vehicle platform 33 is used to generate paths for execution by the vehicle platform 33. The risk associated with that path may subsequently calculated/quantified by another module 22 based on the compiled risk map.

Accordingly, a risk map compiler 24 obtains an actuation capability of the vehicle e.g. from a sub-system associated with the vehicle platform 33. Moreover, the obtained actuation capability further includes an uncertainty estimation for the actuation capability. The actuation capability may be estimated by the control circuitry based on raw sensor data provided from the sub-system of the vehicle platform 33, or it may be directly obtained as processed sensor data (i.e. the raw sensor data may be pre-processed and then sent to the risk map compiling module 24).

In an illustrative example, the obtained actuation capability may comprise a braking capacity and an uncertainty estimation or a type of "error margin" of the obtained braking capacity. For example, if the obtained braking capacity is indicative of the vehicle being able to come to a complete stop (assuming emergency braking actuation) within a distance of 150 meters, then an uncertainty estimation for this estimation may include an error margin of ±15 meters (i.e. ±10%). As mentioned in the foregoing, the actuation capability may be given from statistical models of one or more actuation parameters where the uncertainty estimation for each actuation parameter may be defined by the standard deviation in those statistical models.

Further, the risk map compiler 24 obtains a location of free-space areas in the surrounding environment of the vehicle (e.g. from the perception system 31 of the vehicle), where the obtained location of free-space areas comprises an uncertainty estimation for the estimated location of free-space areas. In FIG. 3, this is indicated as "world view+ uncertainties", in the ADS module 30. As mentioned in the foregoing, free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may comprise a determined location of external objects (static and dynamic objects), determined trajectories of dynamic objects, as well as an estimate of the uncertainty of the determinations, i.e. the likelihood of the determined location of the free-space area actually being true.

Then, a risk map is generated or formed by the risk map compiling module 24 based on the obtained actuation capability and the obtained location of free-space areas. The risk map comprises a risk parameter for each of a plurality of area segments comprised in the surrounding environment of the vehicle. The risk map may be understood as a virtual map of the surrounding environment of the vehicle with a number of defined area segments, each being associated with a corresponding risk parameter.

Further, a compounded risk value of the ADS is determined based on the risk parameters of a set of area segments of the risk map. In more detail, the compounded risk calculation module 22 obtains the planned paths of the ADS as well as the risk map in order to calculate the compounded risk as exemplified in the foregoing.

In some embodiments, for each time instance, the compounded risk is estimated by adding together the risk of the area segments that the planned path intersects. In some embodiments, this is simplified through the use of a grid, as depicted in e.g. FIG. 5. Accordingly, one can then just add the risk parameter for each of the "boxes" (area segments) that the path passes through to get an estimate of the risk of the path, which, in some embodiments, represents the risk exposure of the ADS at the current time instant. However, as previously mentioned, the compounded risk of a single situation may be determined by e.g. calculating the risk of a nominal path on the map, taking the lowest risk path available or by looking at the risk parameters of the area segments of the entire risk map, as exemplified in the foregoing.

Further, in some embodiments, the control system 10 further comprises a scenario monitoring module 25 configured to monitor a scenario trigger. In more detail, the scenario monitoring module 25 is configured to monitor the scenario trigger by monitoring at least one of:

The determined compounded risk value against a (predefined) compounded risk trigger threshold. This may be monitored by monitoring the output from the compounded risk calculation module 22.

A development of the risk map over time against a (predefined) map volatility trigger threshold. This may be monitored by monitoring the output from the risk map compiling module 24.

A development of the compounded risk value over time against a (predefined) risk volatility threshold. This may be monitored by either monitoring the "overall risk", i.e. taking into account the whole risk map, or by monitoring the risk of the planned path. In reference to the latter, the monitoring of the planned path, allows the scenario monitoring module 25 to assess whether the current risk of the path selected for execution changes too drastically with respect to the risk of the path obtained at a preceding time instance/sample.

Moving on, FIG. 4 is a schematic top view illustration of a risk map 40 with some example components 41-46" contributing to the risk map 40 in accordance with an embodiment of the present invention. Furthermore, the planned path for execution 47a-c of the ego-vehicle is indicated in the map 40. In more detail, dashed line arrows indicate the "planned paths" 47a, and 47b from the two preceding time instances/samples and the currently planned and selected path 47c is indicated by the arrow in front of the vehicle.

Further, the risk map 40 comprises information indicative of an estimated braking capacity of the vehicle 43 including uncertainty estimation 43', 43" of the same. Further, the risk map 40 comprises a geographical position 41 of the ego-vehicle in the map, the uncertainty estimation 42 of the geographical position 41, a position of external objects 44, 46, uncertainties of the position of the external objects 44', 44", 46', trajectories 45 of dynamic objects 44 and uncertainties 45' 45" of the trajectories 45. The estimated uncertainties may for example be computed based on models (predefined or self-learning/Machine-learning) defining a tolerance or error-margin in the measurements provided from the sensors of the vehicle (e.g. cameras, radar, LiDAR, ultrasonic sensors, etc.). Thereby, the formed risk map 40 also accounts for uncertainties inherent in such measurements of the ego-vehicle's worldview caused by for example, sensor manufacturing tolerances, noise, and so forth. Accordingly, the whole risk estimation is rendered more accurate and reliable, more accurately reflecting the actual risk exposure of the ADS of the vehicle.

FIG. 5 is a schematic top view illustration of a risk map from FIG. 4 with area segments 51 indicated in the form of a grid 50 in accordance with an embodiment of the present invention. As described in the foregoing, in order to determine the compounded risk of the path planned for execution 47, one may add together the risk values associated with the area segments that the planned path 47 intersects 52.

Figure 7:
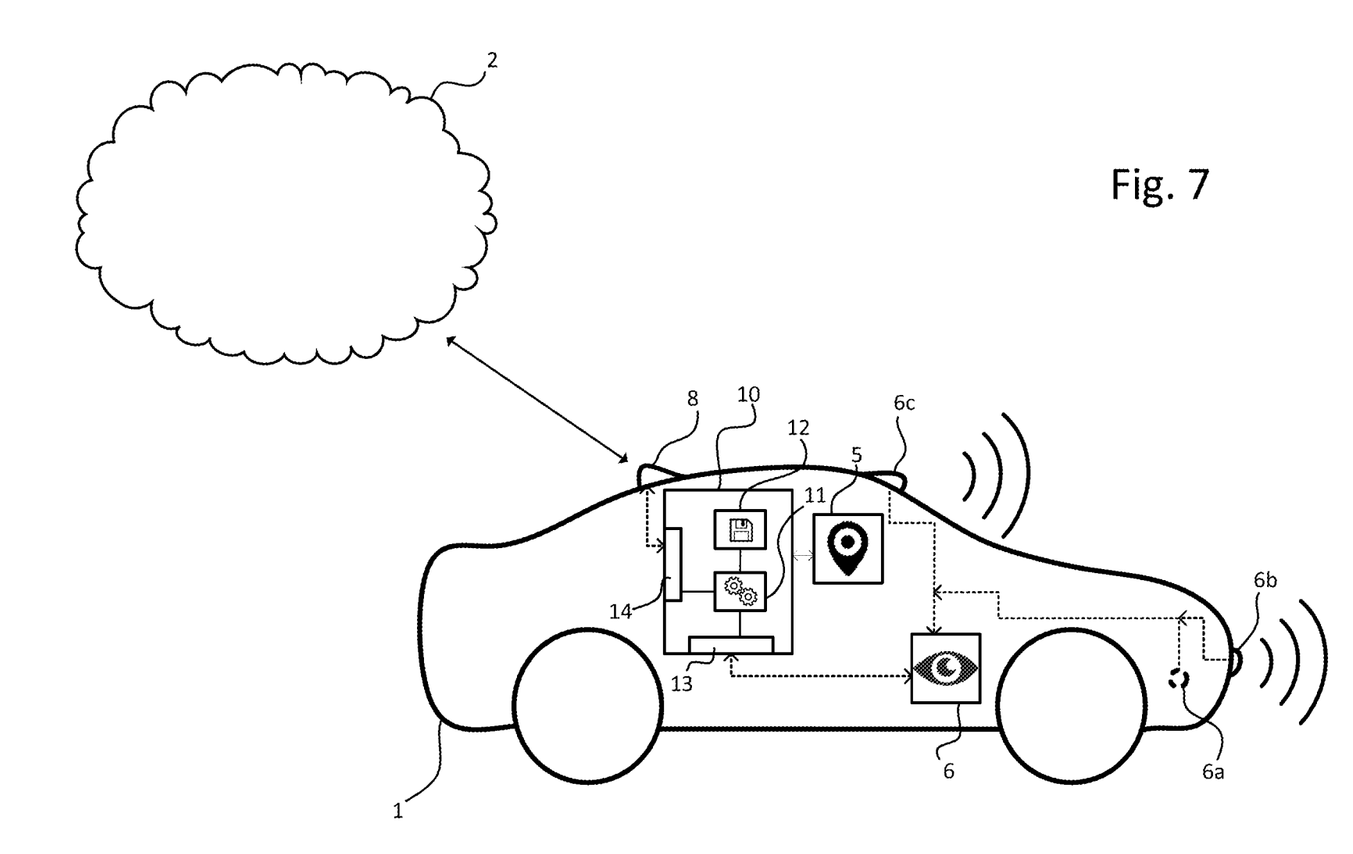
FIG. 7 is a schematic side view of a vehicle comprising a control system for identifying scenarios of interest for development, verification and/or validation an Automated Driving System (ADS) of a vehicle in accordance with an embodiment of the present invention.

FIG. 7 depicts a schematic side view of a vehicle 1 comprising a control system 10 for identifying scenarios of interest for development, verification and/or validation of an ADS of a vehicle in accordance with an embodiment of the present invention. The vehicle 1 further comprises an ADS, a perception system 6, and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for identifying scenarios of interest for development, verification and/or validation of an ADS of a vehicle 1 according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The control system 10 is further provided with a communication interface 14 and a sensor interface 13.

The control circuitry 11 is configured to obtain a risk map of a surrounding environment of the vehicle based on an actuation capability of the vehicle and a location of free-space areas in the surrounding environment. The actuation capability includes an uncertainty estimation for the actuation capability and the location of free-space areas comprises an uncertainty estimation for the estimated location of free-space areas. The risk map comprises a risk parameter for each of a plurality of area segments comprised in the surrounding environment of the vehicle. Further, the control circuitry 11 is configured to determine a compounded risk value of the ADS by evaluating the risk parameters of a selected set of area segments of the risk map, and to monitor a scenario trigger by monitoring at least one of the following triggers:

The determined compounded risk value against a compounded risk trigger threshold.
A development of the risk map over time against a map volatility trigger threshold.
A development of the compounded risk value over time against a risk volatility threshold.

Then, if the scenario trigger is detected, the control circuitry 11 is further configured to store sensor data, the stored sensor data being from a time period around a point in time when the scenario trigger was detected. The control system 10 using any (or all or any combination) of the above suggested embodiments to identify the "high-risk" scenarios is preferably configured to run continuously during the operations of the ADS, i.e. while the ADS is active. Moreover, the buffer capturing all relevant data is preferably continuously on and when a high-risk point is detected, this buffer is allowed to complete before transmitted to back office (or persistently stored for later transmission).

Further, the vehicle 1 may be connected to external network(s) 2 via for instance a wireless link (e.g. for retrieving HD map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 may be or include any number of hardware components for conducting data or signal processing or for executing computer code stored in memory 12. The control system 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compile or render the risk map. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

It will also be understood that, although the term first, second, etc. may be used herein to describe various elements, these elements should not be limited by these terms. These terms are only used to distinguish one element from another. For example, a first action could be termed a second action, and, similarly, a second action could be termed a first action, without departing from the scope of the embodiments.

Although the figures may show a specific order of method steps, the order of the steps may differ from what is depicted. In addition, two or more steps may be performed concurrently or with partial concurrence. For example, the steps of obtaining the actuation capability and the location of free-space areas may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for identifying scenarios of interest for development, verification and/or validation of an Automated Driving System, ADS, of a vehicle, the method comprising:
    obtaining a risk map of a surrounding environment of the vehicle, wherein the risk map is formed based on an actuation capability of the vehicle and a location of free-space areas in the surrounding environment, the actuation capability including an uncertainty estimation for the actuation capability and the location of free-space areas comprising an uncertainty estimation for the estimated location of free-space areas,
    wherein the actuation capability of the vehicle comprises one or more of: a braking capacity, a maximum steering angle and a maximum acceleration capability,
    wherein the risk map comprises a risk parameter for each of a plurality of area segments comprised in the surrounding environment of the vehicle;
    determining a compounded risk value of the ADS based on the risk parameters of a set of area segments of the risk map;
    monitoring a scenario trigger by monitoring at least one of:
        the determined compounded risk value against a compounded risk trigger threshold,
        a development of the risk map over time against a map volatility trigger threshold, or
        a development of the compounded risk value over time against a risk volatility threshold; and
    if the scenario trigger is detected:
    storing sensor data, the stored sensor data being from a time period around a point in time when the scenario trigger was detected.

2. The method according to claim 1, wherein the step of monitoring the determined compounded risk value against a compounded risk trigger threshold comprises:
    for each time instant:
    comparing the determined compounded risk value with the compounded risk trigger threshold; and
    if the comparison indicates a deviation above the compounded risk trigger threshold, the method comprises storing sensor data, the stored sensor data being from a time period around a point in time when the comparison indicated the deviation above the compounded risk trigger threshold.

3. The method according to claim 1, wherein the step of monitoring the development of the compounded risk value over time comprises:
    for each time instant:
    comparing, a difference between the determined compounded risk value and a compounded risk value of a preceding time instant with the risk volatility threshold; and
    if the comparison indicates a deviation above the risk volatility threshold, the method comprises storing sensor data, the stored sensor data being from a time period around a point in time when the comparison indicated the deviation above the risk volatility threshold.

4. The method according to claim 1, wherein the step of monitoring the development of the risk map over time against the map volatility trigger threshold comprises:
for each time instant:
comparing a difference between the obtained risk map and an obtained risk map of a preceding time instant with the map volatility threshold; and
if the comparison indicates a deviation above the map volatility threshold, the method comprises storing sensor data, the stored sensor data being from a time period around a point in time when the comparison indicated the deviation above the map volatility threshold.

5. The method according to claim 1, further comprising: transmitting the stored sensor data to a remote entity.

6. The method according to claim 1, further comprising: temporarily storing the sensor data in a data buffer, the data buffer having a buffer length in the range of 1 second to 300 seconds,
wherein the step of storing sensor data, comprises transferring sensor data from the data buffer, the transferred sensor data comprising sensor data from the time period around the point in time when the scenario trigger was detected.

7. The method according to claim 1, further comprising: obtaining sensor data indicative of:
the actuation capability of the vehicle and the uncertainty estimation of the actuation capability;
the location of free-space areas and the uncertainty estimation for the estimated location of free-space areas;
a position of external objects in the surrounding environment of the vehicle relative to the vehicle and uncertainties of the position of the external objects, trajectories of any dynamic objects of the external objects and uncertainties of the estimated trajectories of the dynamic objects; and
a geographical position of the vehicle, the geographical position including an uncertainty estimation of the estimated geographical position of the vehicle.

8. The method according to claim 7, wherein the step of obtaining the risk map comprises forming the risk map based on the obtained sensor data.

9. The method according to claim 1, wherein each risk parameter is indicative of at least one of a probability of an accident event if the vehicle were to occupy an associated area segment and a probability of violating a predefined safety threshold.

10. The method according to claim 1, wherein the step of storing sensor data further comprises storing the formed risk map, wherein the stored risk map is from a time period around the point in time when the scenario trigger was detected.

11. The method according to claim 10, further comprising:
transmitting the stored risk map to a remote entity.

12. The method according to claim 1, wherein the step of determining the compounded risk value comprises:
determining the compounded risk value of the ADS based on the risk parameters of a set of area segments intersected by at least one planned path of the ADS.

13. A non-transitory computer-readable storage medium storing one or more instructions configured to be executed by one or more processors of an in-vehicle processing system, the one or more instructions for performing the method according to claim 1.

14. A control system for identifying scenarios of interest for development, verification and/or validation of an Automated Driving System, ADS, of a vehicle, the control system comprising:
a control circuitry configured to:
obtain a risk map of a surrounding environment of the vehicle, wherein the risk map is based on an actuation capability of the vehicle and a location of free-space areas in the surrounding environment, the actuation capability including an uncertainty estimation for the actuation capability and the location of free-space areas comprising an uncertainty estimation for the estimated location of free-space areas,
wherein the actuation capability of the vehicle comprises one or more of: a braking capacity, a maximum steering angle, and a maximum acceleration capability,
wherein the risk map comprises a risk parameter for each of a plurality of area segments comprised in the surrounding environment of the vehicle;
determine a compounded risk value of the ADS based on the risk parameters of a set of area segments of the risk map;
monitor a scenario trigger by monitoring at least one of:
the determined compounded risk value against a compounded risk trigger threshold,
a development of the risk map over time against a map volatility trigger threshold, or
a development of the compounded risk value over time against a risk volatility threshold; and
if the scenario trigger is detected:
store sensor data, the stored sensor data being from a time period around a point in time when the scenario trigger was detected.

15. A vehicle comprising:
an Automated Driving System, ADS;
a perception system comprising at least one sensor configured to monitor a surrounding environment of the vehicle;
a vehicle control system comprising at least one sensor configured to monitor an actuation capability of the vehicle;
a localization system configured to monitor a geographical map position of the vehicle;
a control system for identifying scenarios of interest for development, verification and/or validation of an Automated Driving System, ADS, of a vehicle, the control system comprising
a control circuitry configured to:
obtain a risk map of a surrounding environment of the vehicle, wherein the risk map is based on an actuation capability of the vehicle and a location of free-space areas in the surrounding environment, the actuation capability including an uncertainty estimation for the actuation capability and the location of free-space areas comprising an uncertainty estimation for the estimated location of free-space areas,
wherein the actuation capability of the vehicle comprises one or more of: a braking capacity, a maximum steering angle, and a maximum acceleration capability,
wherein the risk map comprises a risk parameter for each of a plurality of area segments comprised in the surrounding environment of the vehicle;
determine a compounded risk value of the ADS based on the risk parameters of a set of area segments of the risk map;

monitor a scenario trigger by monitoring at least one of:
   the determined compounded risk value against a compounded risk trigger threshold,
   a development of the risk map over time against a map volatility trigger threshold, or
   a development of the compounded risk value over time against a risk volatility threshold; and
if the scenario trigger is detected:
store sensor data, the stored sensor data being from a time period around a point in time when the scenario trigger was detected.

* * * * *